Patented Feb. 23, 1954

2,670,352

UNITED STATES PATENT OFFICE 2,670,352

TRICHLOROACETYLPYRIDINES

Theodore I. Fand, White Plains, and Charles F. Lutomski, Yonkers, N. Y., assignors to Nepera Chemical Co. Inc., Yonkers, N. Y., a corporation of New York No Drawing. Application July 12, 1951, Serial No. 236,466

6 Claims. (Cl. 260—297)

Our invention relates to new substituted derivatives of pyridine and refers particularly to pyridine derivatives which are useful as intermediates in preparing medicinal compounds, including vitamins.

One of the important vitamins, niacin (nicotinic acid) is now used in large amounts, and is manufactured at the present time from quinoline and pyridine. Both of these raw materials are produced in limited quantities and their use for other purposes is steadily increasing.

We have found that we can chlorinate the side chain of beta-ethylpyridines under certain conditions to produce chlorinated compounds which can be hydrolyzed to nicotinic acid.

The beta-ethylpyridines are easily and cheaply synthetized, for instance, from paraldehyde and ammonia, resulting in aldehyde collidine (2-methyl, 5-ethylpyridine) from which by dealkylation 3-ethylpyridine may be produced.

The principal object of this invention is to produce side chain chlorinated pyridine compounds which are readily hydrolyzable to pyridine carboxylic acids. Another object is to produce these chlorinated compounds from easily available raw materials. Still another object is to produce reactive intermediate compounds.

Further objects of this invention will appear hereinafter.

We have found that on chlorination of beta-ethylpyridines the chlorine replaces the hydrogens on the second carbon atom from the pyridine ring, and trichloroacetylpyridines are formed. This result is unexpected and surprising because, according to the literature, reaction of aldehyde collidine (2-methyl, 5-ethylpyridine) with bromine at 100° C. forms bromoaldehyde collidine, $CH_3.C_5H_3N.CHBrCH_3$.

The probable chemical reaction of our process is the following:

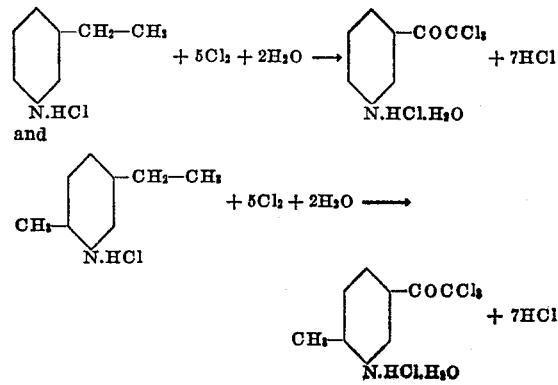

The trichloroacetylpyridine hydrochloride can be readily hydrolyzed with alkali to the corresponding acids, the reaction being

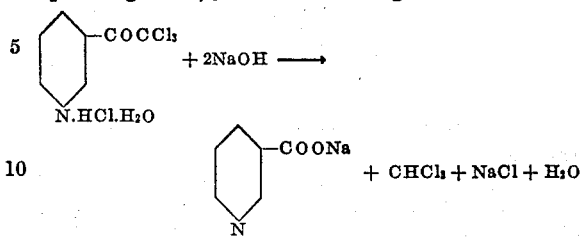

From the sodium salt of the resulting acid the acid itself can be isolated by usual procedure, such as treatment with sulphuric or other acid.

From the trichloroacetylpyridine hydrochlorides, the free compounds may be isolated by dissolving the hydrochlorides in water and neutralizing with sodium bicarbonate. The free base separates as a viscous oily liquid, which darkens and decomposes on standing.

Example 1

71.5 grams of 3-ethylpyridine was placed in a two-neck flask and 52.5 cc. of concentrated hydrochloric acid was added slowly with cooling of the mixture. The flask, equipped with a reflux condenser and a sparger tube for the introduction of chlorine gas, was heated in an oil bath and chlorine bubbled through for 10 hours. During the reaction the mixture was irradiated with an ultra-violet lamp and the bath temperature was kept at 125°–130° C. At the end of the reaction, the mixture was cooled in an ice-water bath. A few drops were withdrawn and diluted with acetone. White crystals came out and these were added to the cold reaction mixture as seed. Immediately a white precipitate came down. After settling out in the cold, the white precipitate was collected on a fritted glass funnel and washed with cold isopropanol. The white product, 3-trichloroacetylpyridine hydrochloride monohydrate (3-pyridyl, trichloromethyl ketone hydrochloride monohydrate) was then dried in a vacuum desiccator. Its melting point is 171–172° C.

On analysis the compound was identified as:

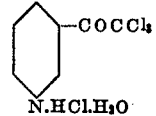

$H_2O$, found: 6.4%, theory: 6.4%; N, found: 5.1%, theory: 5.0%; Cl, found: 50.5%, theory: 50.8%.

The product obtained was hydrolyzed with dilute sodium hydroxide. From the product of hydrolysis, chloroform and nicotinic acid were obtained, the latter being identified by mixed melting point.

Example 2

80.6 grams of aldehyde collidine (2-methyl,5-ethylpyridine) was placed in a two-neck flask and 52.5 cc. of concentrated hydrochloric acid was added slowly with cooling of the mixture. Chlorine was then bubbled through for 10 hours under the conditions set forth in Example 1. After cooling the reaction mixture, a precipitate began to settle out gradually. The mixture was set aside for about 48 hours in a refrigerator and the white precipitate collected on a fritted glass funnel, washed with isopropanol and dried in a vacuum desiccator. Its melting point is 166–167° C.

On analysis the compound was identified as: 2-methyl,5-trichloroacetylpyridine hydrochloride monohydrates, (5-picolyl(2), trichloromethyl ketone hydrochloride monohydrate)

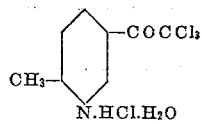

$H_2O$, found: 6.0%, theory: 6.1% N, found: 5.1%, theory: 4.8%; Cl, found: 46.8%, theory: 47.5%.

The product obtained was hydrolyzed with dilute sodium hydroxide. From the product of hydrolysis, chloroform and 6-methylnicotinic acid were obtained. The latter was identified by mixed melting point using a known sample of 6-methylnicotinic acid. There was no depression of the melting point; M. P. 212–213° C.

As will be seen, we have invented a method of synthesizing trichloroacetylpyridines and their hydrochloride monohydrates from readily available starting materials. These compounds are very reactive and are easily hydrolyzable to pyridine carboxylic acids. Our invention, therefore, includes the production of new intermediates for the production of such acids.

What is claimed as new is:

1. In a process of producing beta-trichloroacetylpyridines, the step of chlorinating a water-soluble salt of beta-ethylpyridine of the general formula

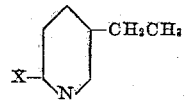

where X is a member of a group consisting of hydrogen and a methyl radical, in the presence of water while irradiating the mixture with ultra-violet rays.

2. In a process of producing beta-trichloroacetylpyridines, the steps of heating the hydrochloride of a beta-ethylpyridine of the general formula

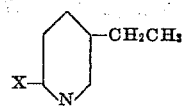

where X is a member of a group consisting of hydrogen and a methyl radical in aqueous solution and bubbling chlorine gas through the reaction mixture, while irradiating said mixture with ultra-violet rays.

3. In a process of producing beta-trichloroacetylpyridines, the steps of heating the hydrochloride of a beta-ethylpyridine of the general formula

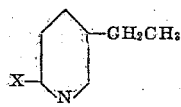

where X is a member of a group consisting of hydrogen and a methyl radical in aqueous solution to 125°–130° C. and bubbling chlorine gas through the reaction mixture for about 10 hours, while irradiating said mixture with ultra-violet rays, cooling the reaction mixture and collecting the reaction product formed.

4. The compounds of the general formula:

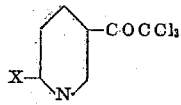

where X is a member of a group consisting of hydrogen and a methyl radical, and their water soluble acid addition salts.

5. 3 - trichloroacetylpyridine hydrochloride monohydrate.

6. 2-methyl, 5-trichloroacetylpyridine hydrochloride monohydrate.

THEODORE I. FAND.
CHARLES F. LUTOMSKI.

References Cited in the file of this patent

UNITED STATES PATENTS

| Number | Name | Date |
| --- | --- | --- |
| 1,761,475 | Gubelmann et al. | June 3, 1930 |
| 2,414,783 | Wenner et al. | Jan. 21, 1947 |
| 2,453,944 | Snell | Nov. 16, 1948 |
| 2,543,817 | Weil | Mar. 6, 1951 |